United States Patent [19]

Myrick

[11] Patent Number: 5,518,094
[45] Date of Patent: May 21, 1996

[54] CLUTCH/BRAKE HAVING RECTANGULAR-AREA-CONTACT 3D LOCKING SPRAGS

[75] Inventor: Thomas Myrick, West Caldwell, N.J.

[73] Assignee: Honeybee Robotics, Inc., New York, N.Y.

[21] Appl. No.: 279,287

[22] Filed: Jul. 22, 1994

[51] Int. Cl.⁶ .................................................. F16D 41/06
[52] U.S. Cl. ...................... 192/45.1; 192/43.1; 188/82.77
[58] Field of Search .................................. 192/45.1, 41 A, 192/43.1; 188/82.2, 82.7, 82.77

[56] References Cited

U.S. PATENT DOCUMENTS

| | | | |
|---|---|---|---|
| 3,326,342 | 6/1967 | Hack | 192/45.1 |
| 3,978,950 | 9/1976 | Timtner | 192/41 A |
| 4,819,775 | 4/1989 | Witt et al. | 192/41 A |
| 5,275,261 | 1/1994 | Vranish | 188/82.2 |

Primary Examiner—Andrea L. Pitts
Attorney, Agent, or Firm—Ostrager, Chong & Flaherty

[57] ABSTRACT

A clutch or brake device has locking sprags engageable between its inner and outer races which have a three-dimensional wedge shape with respect to the rotational (Z) axis. The 3D locking sprags have contact surfaces shaped to make rectangular area contact with the corresponding surfaces of the inner and outer races for reduction and improved distribution of contact stresses. The 3D sprags are also shaped with a constant-angle contact surface in cross-section in a plane normal to the Z-axis for self-compensation with wear and maintenance of effective locking angles under loads.

9 Claims, 3 Drawing Sheets

CLUTCH/BRAKE HAVING RECTANGULAR-AREA-CONTACT 3D LOCKING SPRAGS

FIELD OF THE INVENTION

This invention generally relates to braking devices and over-running clutches, and particularly to improved locking sprags for positively engaging and releasing torque transmission between input and output members.

BACKGROUND ART

Prior clutch or brake devices have used various types of rollers, sprags, or cam elements for engaging and releasing torque transmission between input and output members. Such locking elements have generally taken the form of cylindrical rollers, spherical balls, or cam shapes of various designs. The locking elements in conventional clutch or brake devices have a limit to their torque capacity due to their design and the loading dynamics (two-dimensional in nature). The wear on these conventional locking elements becomes excessive (due to high contact stresses) as the load increases. This reduces the life cycle and performance of the unit and may also result in the elements going "over-center" as the wear progress.

In an over-center situation the locking elements could be placed in a state where they are unable to transmit any load from the input to the output member (free wheeling in both directions), or it is also possible that they could become jammed between the inner and outer races thus permanently coupling the input to the output. In an effort to reduce stress on mechanical members, conventional over-running clutches are forced to grow both in mass and volume, thus limiting their use to non-critical mass/volume applications. Particle generation due to excessive wear has also, in the past, prevented the use of conventional clutch or brake devices in cleanroom and aerospace applications.

Recent developments have used locking elements or sprags between the inner and outer races of a clutch or brake which have a three-dimensional shape in the direction of the Z (rotational) axis. Such 3D sprags provide performance and service life characteristics that are superior to conventional locking elements which have only two-dimensional (2D) geometries (i.e., contact surfaces shaped only relative to the plane normal to the Z axis, but not shaped along the Z axis), because effective locking is achieved at sprag angles that are larger than those used in 2D shapes (e.g., 6 degrees). The 3D geometry in the Z-axis direction, and the subsequent increase in sprag locking angle (e.g., 12 degrees), allow the clutch or brake device to withstand higher loads with lower wear.

Although 3D sprags provide a remarkable advantage over 2D sprags in load capacity and housing weights, their loading surfaces could be further optimized. The 3D sprags interface with the convex/concave races of the clutch or brake device at essentially point contacts (in cross-section). Such point contacts result in contact (Hertzian) stresses which, although low compared to 2D sprags, are nevertheless high enough in some circumstances to warrant improvement. Also, it is desirable to improve the design of 3D sprags to provide other advantages, such as longer service life, better wear characteristics, reliability of operation, etc.

SUMMARY OF THE INVENTION

The purpose of the present invention is to increase the load bearing capacity of 3D sprags and provide added advantages of self-compensation with wear, simplified manufacturing, reliable operation, etc.

In accordance with the invention, a clutch or brake device has annular input and output members arranged concentrically on a common Z axis, the input and output members having respective annular race surfaces facing opposite each other across a race groove in a plane normal to the Z axis. A plurality of locking elements are provided in spaced relation to each other in the race groove, and are actuatable for engaging with and releasing from the race surfaces of the input and output members. The locking elements have a symmetric wedge shape in the direction of the Z axis formed by upper and lower sections having mutually inclined contact surfaces at a selected angle to the Z axis. The contact surfaces of each locking element and the race surfaces of the input and output members are shaped as complementarily mating surfaces that make contact along a line segment when viewed in cross-section in a plane including the Z-axis, thereby providing a rectangular-area contact when viewed three-dimensionally.

In a preferred embodiment, the rectangular-area contact 3D locking sprags are optimally designed to have a constant contact angle (nautilus profile) for their cross-section in the plane normal to the Z axis. The constant-angle design allows for self-compensation due to wear and maintenance of effective locking angles under increasing loads, ease of machinability, high radii of curvatures for reduced contact stresses, and better overall brake/clutch stiffness characteristics.

The mode of operation and other features and advantages of the present invention are described in detail below with reference to the following drawings.

DETAILED DESCRIPTION OF THE INVENTION

Figure 1A:
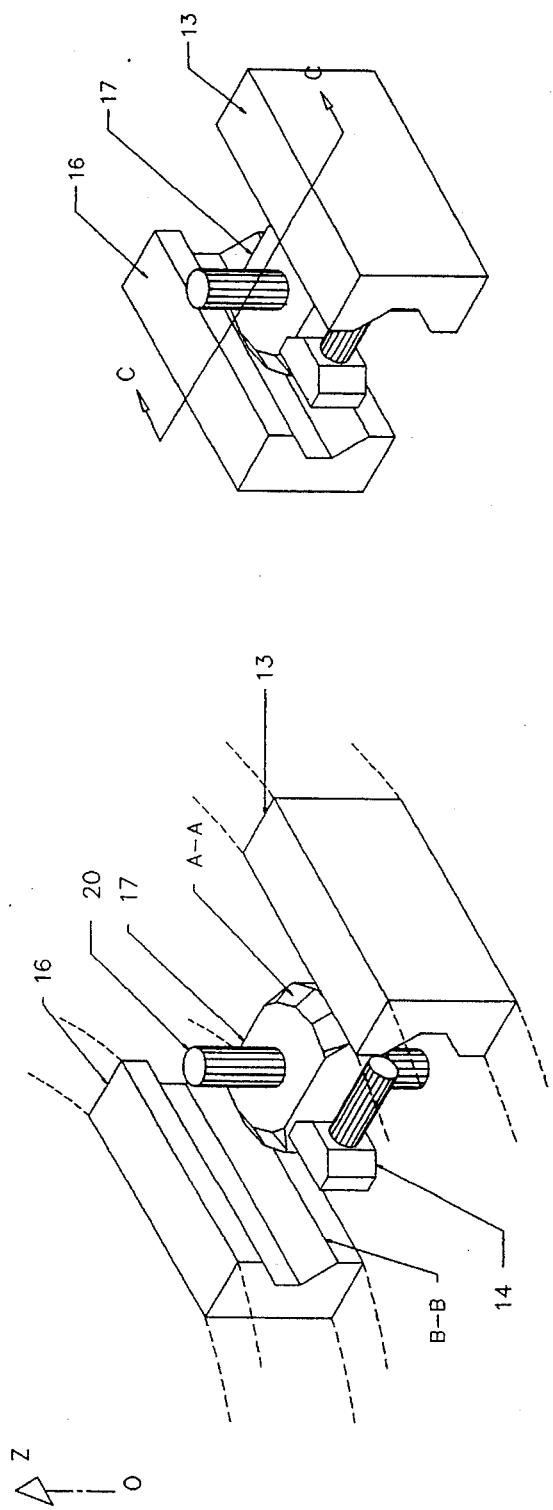
FIGS. 1a, 1b and 1c are exploded, assembled, and side sectional schematic views showing the improved 3D locking sprags in between input and output members of a clutch or brake device.
Figure 1B:
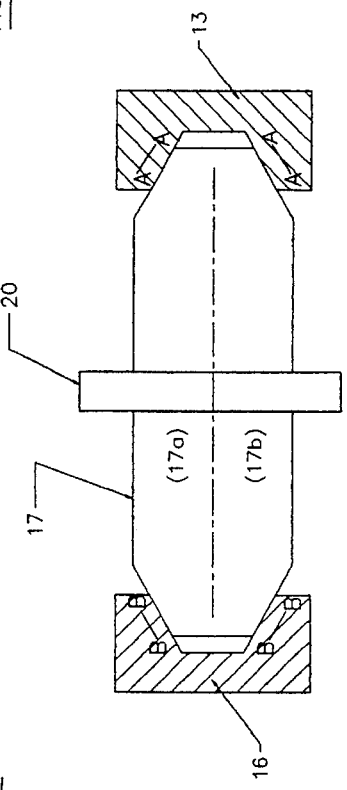
Figure 1C:
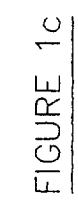

FIGS. 1a–1c show the general concept for operation of 3D locking sprags, i.e., locking elements having a three-dimensional shape, in a clutch or brake unit. The indicated Z axis is the direction of the rotational axis of the clutch/brake unit. The clutch or brake unit has an inner race 16 and an outer race 13 which are generally annular in shape and are concentric on a rotational Z axis. The inner and outer races are rotatable relative to each other in a clockwise or counter-clockwise direction (uni-directional unit), or in both directions (bi-directional unit). The inner and outer races may be coupled to the operating parts of a clutch or brake unit in various ways depending upon the specific application. For example, the inner race can be coupled to an inner shaft mounting a rotatable part and the outer race fixed to a stationary housing of a brake unit, or the inner race can be coupled to a driven input shaft and the outer race to a rotatable output member of a clutch unit. The main point is only that they are rotatable relative to each other. For purposes of the following description, the example is used of the inner race rotating in a clockwise direction relative to the outer race. However, it is understood that the principles of the invention disclosed herein apply equally in the reverse direction.

The inner and outer races 16 and 13 have circular loading or contact surfaces that face opposite apart from each other across a circular groove or gap. A plurality of locking sprags 17 are provided in the race groove spaced apart circumferentially from each other for proper distribution of loading forces. The locking sprags 17 are controllably actuated between positions wherein they frictionally engage the inner and outer races to stop their relative rotation, and positions wherein the inner and outer races are released to be freely rotatable relative to each other. Each of the locking sprags 17 has loading or contact surfaces which mate complementarily with the contact surfaces of the inner and outer races. It is a principal objective that engagement and release of the locking sprags be performed for braking or torque transmission functions in a reliable manner consistent with the loading forces expected in the application for which the brake or clutch is used.

For handling high contact stresses, it is found to be advantageous that the locking sprags 17 have a three-dimensional (3D) shape in the direction of the Z (rotational) axis of the clutch/brake unit. As shown in FIG. 1c, the preferred 3D shape is a wedge shape defined by symmetric upper and lower sections (17a, 17b) having mutually inclined contact surfaces at a selected angle to the Z axis. The wedge-shaped contact surfaces of the locking sprags 17 engage complementarily shaped wedge or "V" shaped contact surfaces formed in the inner and outer races 16 and 13.

The locking sprags 17 are rotatably held relative to each other in position on shafts 20 which are retained at their upper and lower ends by a carrier ring (not shown). A tripping mechanism 14 is provided for rotating each sprag on its shaft 20 between angular positions wherein the contact surfaces engage the inner and outer races and angular positions wherein they release the inner and outer races. These parts, as well as the housing, mountings, and other working parts of a clutch or brake unit, are implemented in an operable manner as is well known conventionally, and are not described further herein.

Each locking sprag 17 can lock and release the inner and outer races in one direction of relative movement, i.e., in a clockwise direction or in a counter-clockwise direction. The locking sprags 17 may be positioned in the race groove in complementary pairs for engaging/releasing torque transmission in both the clockwise and counter-clockwise directions to form a bi-directionally operable clutch/brake unit. The tripping mechanisms for the sprags may be actuated electromagnetically by an electromagnet or solenoid or mechanically by a hydraulic piston or other device.

As compared to the friction plates commonly used in conventional electromagnetic clutch/brakes, the 3D wedge shape of the locking sprags are particularly useful in on-orbit applications, with its elimination of problems such as particle generation and poor repeatability over thermal variations and time. More importantly, the 3D locking elements offer a torque reaction control capability crucial to safe operation of mechanisms on orbit or terrestrial at performance levels heretofore unattainable with 2D sprags.

Prior designs for locking sprags which have a three-dimensional shape have interfaced with the convex/concave races of the clutch or brake device at essentially point contacts (when viewed in cross-section in a plane including the Z-axis) or circular area contacts when viewed three-dimensionally. Such point (or circular area) contacts result in contact (Hertzian) stresses which are high enough in some circumstances to warrant improvement. The present invention improves upon existing 3D sprags by eliminating circular area contacts and introducing rectangular-area contacts. Rectangular area contact is achieved when the contact surface of the locking sprag has a profile which maintains a line segment contact (when viewed in cross-section) with the mating surface of the inner or outer races or a rectangular-area contact when viewed three-dimensionally.

FIG. 1c illustrates the rectangular-area contact between the upper and lower sections of the sprag 17 and the outer race 13 along line segments A—A, and between the sprag 17 and the inner race 16 along line segments B—B. Loads on these surfaces are distributed over a rectangular area (when viewed three-dimensionally) which reduces the peak contact stresses. The line segments are at symmetric inclined angles to the Z-axis direction. The included angle of the wedge shape defined by the line segments is twice the complement of the inclined angle to the Z-axis. Test results have shown that a rectangular-area contact sprag with about a 45 degree chamfered edge (90 degrees included angle between upper and lower sprag sections) locked repeatably and effectively under loads. Optimization of the wedge angle can be tested for the specfic application and loading forces expected to be encountered.

The rectangular-area contact 3D sprags can be manufactured with a wide range of tolerances and are compatible with standard machine tools for manufacturing. A double-angle shank or arbor mounted milling cutter is used to machine the flat-sided V-groove into the interfaces that mate with the sprags. Similarly, a double sided chamfering end mill is used to machine the sprag to fit within the V-groove. It is possible to use the tools in reverse, that is, to machine the V-groove in the cam (with the double-angle end mill) and its interface in the housing or shaft (with the chamfering tool). Any combination of these features can be employed as long as the angles machined therein are the desired ones to cause locking.

Figure 2:
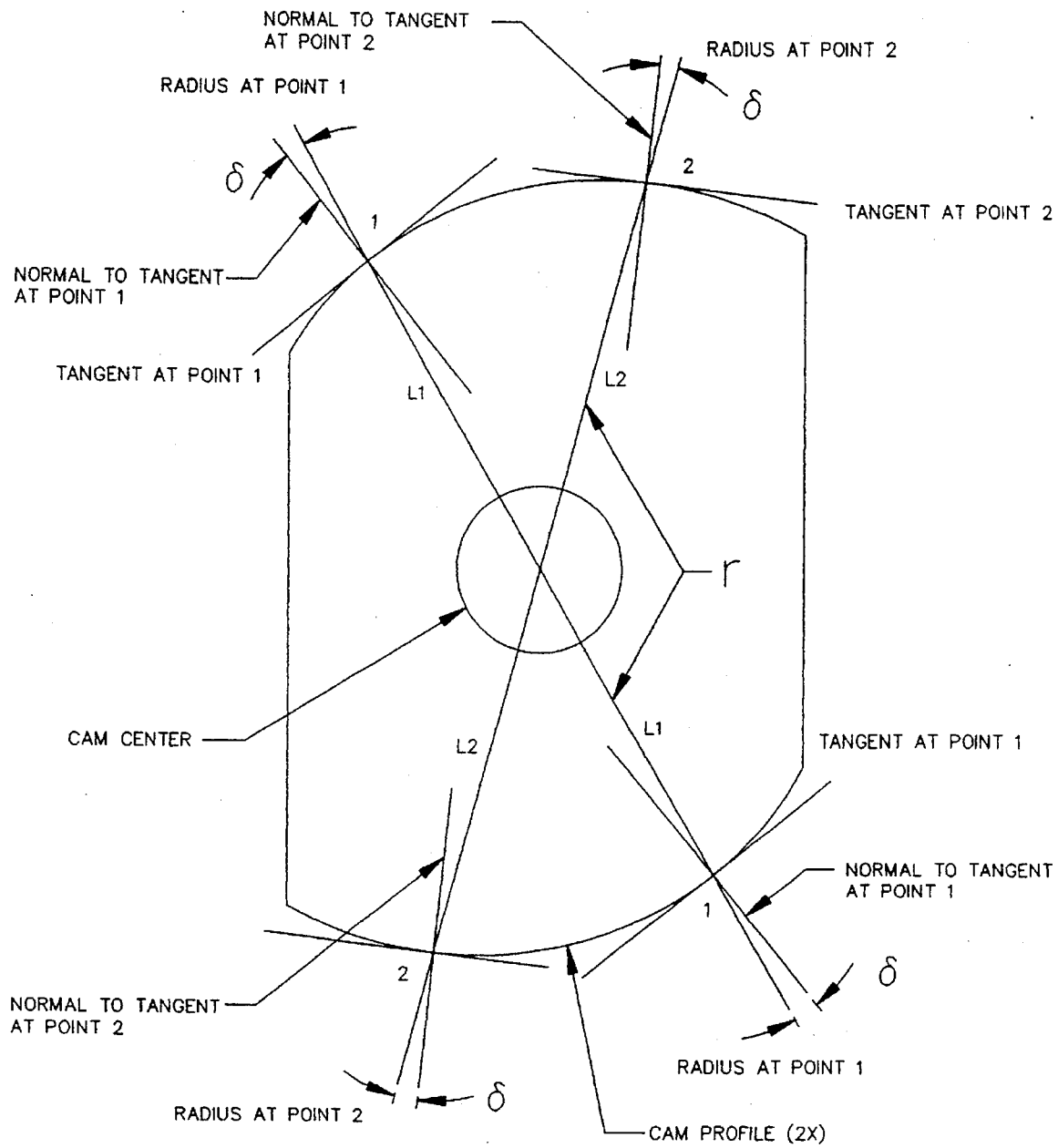
FIG. 2 is a cross-sectional view of a preferred embodiment of the 3D locking sprag having a shape which maintains constant-angle contact with a contact surface.
Figure 3:
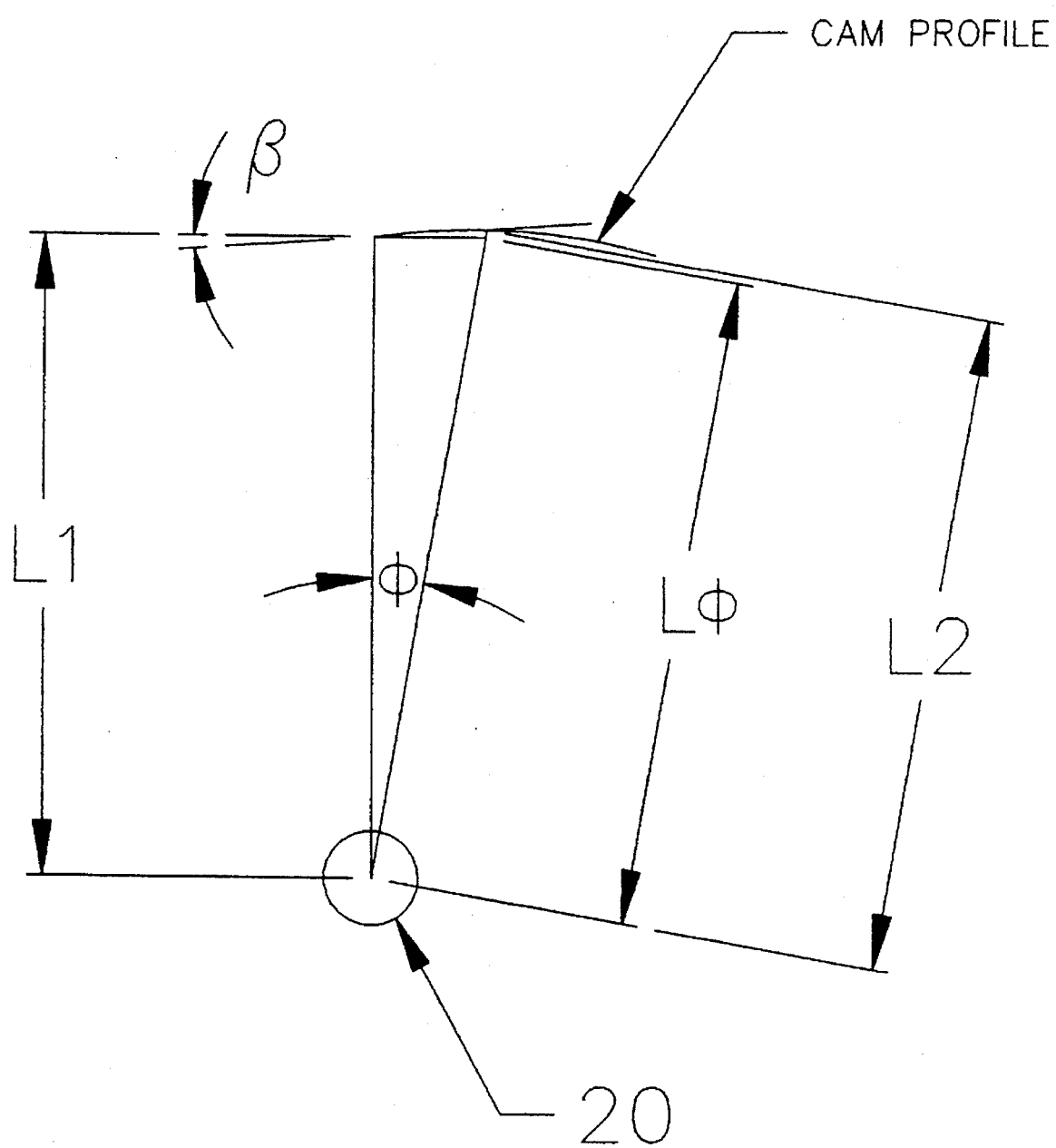
FIG. 3 is a schematic diagram illustrating the geometry for generating a preferred constant-angle profile for the locking sprag.

A further feature of the invention is the shaping of the contact surfaces of the sprags 17, viewed in cross-section in a plane normal to the Z-axis, so that it maintains a constant angle of contact with the race surfaces. The constant-angle sprag surface functions like a cam with a variable surface, and the sprag is interchangeably referred to hereinafter as a cam. As illustrated in FIGS. 2 and 3, a constant-angle contact is one which maintains a constant angle δ between the normal to its surface tangent and its radius through the point of tangency as it rolls to allow locking action to shift from point 1 to point 2. As the locking sprag rolls between contact points with the surfaces of the inner and outer races, the angular inclination of the sprag shifts, the angular positions of contact with the races shift, and the sprag experiences deformation under the progressive increase in loading forces. The radii $L\phi$ from the cam center, as well as the angle of tangency of the points of contact of the sprag, are thus progressively changed across the cam surface. The objective of the constant-angle contact surface is to maintain the locking angle 6 constant across all points of contact. The basis for this development is as follows:

Given:

L1=any desired initial radius,

δ=chosen cam angle (for locking) and

β=δ−φ/2 where φ is the angle at the radius to be determined, then:

$L\phi = L1/\cos \phi$

Mφ=L1[(tan φ tan β)/(sin φ tan β−cos φ)]

L2=Lφ+Mφ (desired radius at φ).

A preferred constant-angle shape has a constant angle of about δ=12 degrees or less (similar to a nautilus profile). The nautilus profile is essentially a logarithmic spiral curve that cuts any radii from a center C at a constant angle δ whose cotangent is m. The polar equation for such a curve is:

r=ae(exp(m rad φ)), where a is the value of r when φ=0.

It is found that the 12 degree constant angle (nautilus profile) sprag, along with the 45 degree chamfered edge (90 degrees included angle) locked repeatably well under a likely range of loads. The constant angle δ may be varied depending upon the application and expected loads, with δ=6 degrees being a lower limit.

The constant-angle profile is well suited to 3D locking sprags. Their design allows for self-compensation due to wear and maintenance of effective locking angles under increasing loads, ease of machinability (conventional CNC), high radii of curvatures (reduces contact stresses drastically) and better overall brake/clutch stiffness characteristics. In practical applications, the brake/clutch housing and shaft will provide contact at the points of tangency and locking will occur depending on the cam angle.

In summary, the present invention provides the following improvements in the use of 3D locking sprags of a clutch or brake device: (1) rectangular contact areas (line segment contact in cross-section in a plane including the Z-axis) for improved Hertzian stress reduction and overall distribution; (2) ease of machinability by using standard cutting tools; and (3) use of a constant-angle profile (in cross-section in a plane normal to the Z-axis) for self-compensation with wear and maintenance of effective locking angles under loads.

Although the invention has been described with reference to certain preferred embodiments, it will be appreciated that many other variations and modifications thereof may be devised in accordance with the principles disclosed herein. The invention, including the described embodiments and all variations and modifications thereof within the scope and spirit of the invention, is defined in the following claims.

We claim:

1. A clutch or brake device comprising:

annular input and output members arranged concentrically to each other on a common Z axis, said input and output members having respective annular race surfaces facing opposite each other across a race groove in a plane normal to the Z axis; and a plurality of locking elements in spaced relation to each other in said race groove which are actuatable for engaging with and releasing from the race surfaces of said input and output members, said locking elements having a symmetric tapered shape in the direction of the Z axis formed by upper and lower sections having mutually inclined contact surfaces at a selected angle to the Z axis, and said contact surfaces of said locking elements and said race surfaces of said input and output members being shaped as complementarily mating surfaces that make contact along a line segment when viewed in cross-section in a plane including the Z-axis, wherein each of said contact surfaces of said locking elements provides a rectangular-shaped contact area with the mating contact surface of said input and output members.

2. A clutch or brake device according to claim 1, wherein said race surfaces of said input and output members are each shaped with a tapered shape in the direction of the Z axis formed by upper and lower sections correspondingly mating with the upper and lower sections of said locking elements.

3. A clutch or brake device according to claim 2, wherein the upper and lower sections of each of said locking elements make contact with the race surfaces of said input and output members along respective line segments at symmetric inclined angles with respect to the Z-axis.

4. A clutch or brake device according to claim 3, wherein the contact surfaces of each of the upper and lower sections of each locking element are inclined at about a 45 degree angle with respect to the Z-axis, and form a chamfered edge on the locking element with an included angle of about 90 degrees between contact surfaces.

5. A clutch or brake device according to claim 1, wherein said locking elements are shaped with a constant-angle contact surface in cross-section in a plane normal to the Z axis.

6. A clutch or brake device according to claim 5, wherein said constant-angle contact surface is formed with a constant angle of about 12 degrees between the normal to its surface tangent and its radius through the point of tangency as it rolls in contact with a race surface.

7. A clutch or brake device according to claim 1, wherein said locking elements are provided in complementary pairs for engaging and releasing in both the clockwise and counter-clockwise directions to form a bi-directionally operable unit.

8. A clutch or brake device according to claim 1, wherein said input member is an inner rotatable shaft and said output member is an outer driven member.

9. A clutch or brake device according to claim 1, wherein said input member is an inner rotatable hub and said output member is fixed to a stationary housing.

* * * * *